Patented Mar. 30, 1937

2,075,468

UNITED STATES PATENT OFFICE 2,075,468

LEAVENING PROCESS

Joseph S. Reichert, Niagara Falls, N. Y., and William J. Sparks, Urbana, Ill., assignors to E. I. du Pont de Nemours & Company, Incorporated, Wilmington, Del., a corporation of Delaware No Drawing. Application March 31, 1934, Serial No. 718,407

1 Claim. (Cl. 99—90)

This invention relates to the production of baked raised products such as bread, cake, biscuits, and the like, without the use of yeast or baking powders of the type which evolve carbon dioxide and is a continuation in part of our copending application S. N. 655,680, filed on February 7, 1933, now Patent No. 1,953,567, patented April 3, 1934. More specifically, the invention is a process to effect the raising of baked products both before and during baking by the use of hydrogen peroxide.

In our copending application previously referred to, we have disclosed that oxygen yielding materials such as borax peroxide, sodium percarbonate and urea peroxide as well as hydrogen peroxide can be employed in the raising of the baked products. According to that application, after the addition of oxygen evolving compound decomposable in the mixture it is necessary to allow the dough to stand until the hydrogen peroxide equivalent is less than 0.08% by weight of the dry flour used before placing the dough mixture in the oven. This period of proofing is essential, as disclosed in our previous application, in order that the major portion of the hydrogen peroxide introduced to effect the leavening action shall be decomposed before the loaf is put into the oven. After the introduction of the dough or batter to the oven and its subjection to the heat thereof, the mixture rapidly reaches a temperature at which the enzyme, catalase, present in the batter is destroyed. Since the catalase operates to decompose the hydrogen peroxide in the dough, obviously if too large an amount of hydrogen peroxide remains in the batter at the time it is placed in the oven, all of the hydrogen peroxide will not be decomposed before the temperature of catalase destruction is reached and this will leave free hydrogen peroxide in the product. As disclosed in our previous application, it was at that time considered necessary to proof until the hydrogen peroxide equivalent does not exceed 0.08% based on the weight of the flour used in the batter when oxygen evolving substances such as percarbonates, urea peroxide, borax peroxide and hydrogen peroxide are employed as leavening agents.

We have now made the surprising discovery that hydrogen peroxide is much more satisfactory than the other oxygen evolving compounds disclosed as suitable in our copending application and by using hydrogen peroxide as the leavening material the process is rendered more easily applicable in baking thereby doing away with the necessity for careful and accurate manipulations. In brief, we have discovered that although our previous application suggested that hydrogen peroxide was no more effective than any other oxygen evolving substance, we have now discovered that hydrogen peroxide is not merely the equivalent of such other compounds but is markedly superior to any of them as a leaven in the production of baked raised products.

Accordingly, it is one of the objects of this invention to provide a method for utilizing hydrogen peroxide in the manufacture of bread, cakes, biscuits and the like, without the use of yeast or any carbon dioxide evolving material. We have reaffirmed the statements in our earlier application that in the proper preparation of baked products such as cakes and bread it is essential to control the amount of hydrogen peroxide remaining undecomposed in the dough before its introduction into the oven. We now find, however, that when hydrogen peroxide is utilized as a leaven, the amount of hydrogen peroxide remaining undecomposed in the dough may be considerably greater than is indicated as permissible in our previous application. In brief, the hydrogen peroxide equivalent present in the dough at the conclusion of the proofing period can be much higher than the value we previously believed to be the upper limit of equivalent hydrogen peroxide concentration.

Thus, while it is possible to utilize hydrogen peroxide in the production of baked raised products by allowing the dough to stand outside the oven after the addition of the peroxide until full raising has taken place, nevertheless it is not necessary to complete the raising operation before introduction of the batter into the oven. When the undecomposed hydrogen peroxide in the batter exceeds a certain amount at the conclusion of the proofing period, the baked products when they come out of the oven after the usual baking period, will have a doughy unleavened texture and will contain undecomposed peroxide, although as previously stated, we now find that it is possible to allow a much higher percentage of hydrogen peroxide to remain undecomposed than was considered possible at the time our copending application was filed.

In the patent to Pfeffer No. 989,189 there is described a method of baking bread from high gluten flour in which the patentee suggests the use of peroxide. The hydrogen peroxide is incorporated with the gluten dough and after the dough has been mixed it is immediately formed into separate loaves and placed directly in the oven. The patent does not disclose how to prepare bread from ordinary white flour using hydrogen peroxide as a leavening agent. Nor does Pfeffer disclose any process which makes it possible to utilize hydrogen peroxide as a substitute for baking powder in the preparation of cakes and biscuits.

In the more recent patent to Jacoby No. 1,058,980, it is remarked that hydrogen peroxide is entirely unsuitable as a substitute for baking powder because of its readily decomposable character. The patentee moreover, states that a large quantity of water had been found necessary for the dilution of the hydrogen peroxide and that this is undesirable. In one of the examples of this patent there occurs a suggestion that dough prepared with sodium carbonate should be allowed to stand before baking but it is significant that the patentee does not disclose the necessity of a proofing period when hydrogen peroxide is used and indeed did not succeed in using this peroxide because of its relatively unstable character.

Of course hydrogen peroxide is much more desirable as a leavening agent in baking than oxygen evolving salts such as perborates, persulfates, urea peroxide, etc., because when hydrogen peroxide decomposes it leaves no undesirable residues in the dough, the only decomposition products being oxygen and water. This is a marked advantage for the practice at present is to condemn the addition to a food product of any agent which may leave a foreign material as a residue. Various State and Federal laws rigidly regulate the addition to food products of materials which would introduce impurities therein, either inert or otherwise, and it is advantageous to utilize hydrogen peroxide rather than any oxygen evolving substance which would leave a residue in the baked product.

We have, therefore, devised a method in which hydrogen peroxide could be used for the successful commercial production of baked raised products. Moreover, this method is an improvement on and a continuation of that disclosed in our copending application since increased amounts of undecomposed hydrogen peroxide up to 0.50% based on the weight of the flour used, can be allowed to remain in the dough prior to the introduction of the dough into the oven and still obtain a baked product which is free from undecomposed peroxide and which is of excellent texture and appearance. This permits the use of a shorter proofing period. In commercial practice it is desirable to be able to place the batter in the oven as soon after the introduction of the leavening agent as possible in order that the necessity for extensive storage space may be avoided.

The actual amount of hydrogen peroxide to be added to the dough at the time of mixing varies with the product being prepared and on the amount of raising desired. The quantity of hydrogen peroxide can thus be varied from a very small amount in the case of very slightly raised products to a maximum amount beyond which there is no increase in loaf size with the increase of the quantity of peroxide added.

The maximum amount of peroxide is determined in practical working by the limit of extensibility of the dough. The maximum amount of peroxide should be that amount which will give an amount of gas which can be held by the dough; if more peroxide were added the limit of extensibility would be exceeded and the cells would burst rather than increase the loaf size. The upper limit can be varied with different grades of flour and is controlled by tests made on the various kinds of flour. The maximum amount is in general about 0.5% to 2.0% of hydrogen peroxide based on the weight of the flour used in the dough. More peroxide than the necessary maximum is not only wasteful but may also be harmful. The use of more than the maximum amount would extend the proofing time abnormally and may result in modification of the gluten or other flour constituents.

The proper amount of hydrogen peroxide is first determined and this is preferably added to the liquid such as the water or milk with which the dough is to be prepared. The usual dough ingredients are mixed together utilizing the hydrogen peroxide-containing liquid. After the dough has been formed it may be proofed for a while before forming into loaves. Preferably it should be molded into the desired shape shortly after the completion of the dough preparation.

The loaves are then allowed to stand and raise which is due to the evolution of oxygen from the peroxide decomposing in the dough. This standing or proofing continues until not more than 0.5% of hydrogen peroxide based on the weight of the flour in the dough, remains therein, regardless of the initial hydrogen peroxide concentration. The time required to reach this peroxide concentration, which is the time of proofing, varies with the amount added at the start and with the activity of the flour.

The proper time at which to bake, which is of course dependent on the time required for the hydrogen peroxide content of the dough to reach the value of 0.50% or less can be determined by use of the following test. Twenty grams of the dough is suspended in 50 cc. of an aqueous solution of sulfuric acid containing 20% of acid by volume. Five cc. of a 6% aqueous solution of nitric acid is then added together with 50 cc. of water. The mixture is heated to 90° C. and titrated with standard sodium nitrite solution (0.1786 N, $NaNO_2$). The end point of this titration may be ascertained by an electrometric apparatus or by the slight color change to a pale reddish yellow readily observable.

When the titration test as described, shows that the hydrogen peroxide concentration of not more than the limiting amount based on the weight of the flour is present the loaf may be baked and the finished product will contain no undecomposed peroxide and will have enhanced characteristics as to evenness of structure, firmness of product, uniformity of texture, pleasing whiteness and taste, and other desirable characteristics. The dough after having reached this point in the decomposition with hydrogen peroxide therein, may be allowed to stand for a short time thereafter.

The essential features of our invention are the use of hydrogen peroxide as a leavening agent and not any other oxygen evolving material and permitting the dough to stand after the addition of the hydrogen peroxide until the peroxide content does not exceed that amount which will remain undecomposed in the dough before the catalase destroying temperature is reached when the batch is introduced into the oven. We have found that as an upper maximum limit 0.50% by weight based on the flour in the batch, of undecomposed hydrogen peroxide may be left in the batter at the conclusion of the proofing period, utilizing hydrogen peroxide solution as the leavening agent. However, we wish it to be understood that this maximum value of 0.50% is the maximum amount of hydrogen peroxide that can be allowed to remain in the batter and still insure its complete decomposition before the catalase destroying temperature is reached after the introduction of the loaves or cake into the baking chamber. The factor which affects and determines the permissible residual hydrogen peroxide content at the end of the proofing period is how quickly the temperature at which the catalase is rendered inactive by the agency of heat is reached after the baked product is placed in the oven and in its broadest aspects this step of our invention consists of proofing until no more hydrogen peroxide is present in the dough than will be decomposed before the temperature at which the catalase is reached during the subsequent baking step.

As an example of our process the following may be given:

Example

A cake batter consisting of the following ingredients was prepared as described below:

| | |
|---|---|
| Granulated sugar _____ grams__ | 349 |
| Salt _____ do____ | 6.5 |
| Shortening (hydrogenated oil product) _____ grams__ | 175 |
| Dried egg albumen _____ do____ | 6.25 |
| Water _____ cc__ | 38.4 |
| Egg whites _____ grams__ | 179 |
| Milk _____ cc__ | 280 |
| Flour _____ grams__ | 453 |
| Vanilla extract _____ do____ | 6.5 |
| Hydrogen peroxide (100 volume) _____ cc__ | 15.4 |

The hydrogen peroxide amounted to about 1.06% by weight of the flour in the batter. The cake was prepared by the following procedure.

The sugar, salt and shortening were blended and creamed for five minutes. The egg whites and egg albumen were then added and the mixture lightly creamed for three to four minutes. Part of the milk, containing the vanilla extract, and all of the flour were added alternately and the batter mixed until smooth. The remainder of the milk to which the hydrogen peroxide had been added as leaven was mixed with the batter.

After mixing the batch was placed in the pans or molds and introduced into the oven. The time between the introduction of the hydrogen peroxide and the placing of the boxes, with insulated sides and bottoms, containing the batter in the oven was approximately four minutes. The hydrogen peroxide content at the time the cake was placed in the oven was 0.285% based on the weight of the flour in the batter.

A baking temperature of 300–325° F. was maintained for one hour and thirty-five minutes. At the end of that time there was no free hydrogen peroxide present therein as determined by the sensitive potassium iodide test. The texture of the cakes was very even and free from objectionable voids, the color was light, and the flavor excellent. In all respects the cakes were Grade A commercial products.

Various details of the procedure disclosed in this application have been given in order that the best method of practicing this invention may be disclosed. We desire, however, to emphasize that the various manipulative details are to be considered merely as illustrative and not as restrictive and the scope of our invention is to be limited solely by the breadth of the appended claim.

We claim:

A method of preparing baked raised products without yeast or carbon dioxide evolving materials which comprises incorporating hydrogen peroxide with the dough ingredients in an amount sufficient to act as a leaven therefor, proofing until the amount of hydrogen peroxide remaining undecomposed does not substantially exceed that amount which will be decomposed before the catalase destroying temperature is reached in the dough during baking, and then baking.

JOSEPH S. REICHERT.
WILLIAM J. SPARKS.